ns% United States Patent Office 3,591,636
Patented July 6, 1971

3,591,636
SUBSTITUTED BENZYLIDENEAMINO GUANIDINES
William J. Houlihan and Robert E. Manning, Mountain Lakes, N.J., assignors to Sandoz-Wander, Inc., Hanover, N.J.
No Drawing. Continuation-in-part of application Ser. No. 743,613, July 10, 1968. This application Sept. 16, 1968, Ser. No. 762,356
Int. Cl. C07c 133/10
U.S. Cl. 260—564        7 Claims

ABSTRACT OF THE DISCLOSURE

Substituted benzylideneamino-3-hydroxy guanidines, e.g., 1-(2,6-dichlorobenzylideneamino)-3-hydroxyguanidine, are useful as hypotensives and agrochemicals.

---

This a contiuation-in-part of application Ser. No. 743,613, filed July 10, 1968, which in turn is a continuation-in-part of application Ser. No. 699,309, filed Jan. 22, 1968, both of which are now abandoned.

This invention relates to benzylideneamino guanidines, acid addition salts thereof, and to methods for their preparation. The substituted benzylideneamino guanidnies of this invention may be represented by the following structural formula:

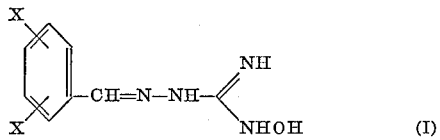

where each X, independently, represents hydrogen or halo having an atomic weight of about 19–36, provided at least one X is other than hydrogen. The compounds of Formula I wherein the X substituents are at the 2,6 positions, and particularly 1-(2,6-dichlorobenzylideneamino)-3-hydroxyguanidine, represent a preferred aspect of this invention.

The compounds of Formula I may be prepared by treating in solvent an aldehyde of the formula

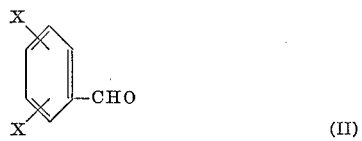

where X is as defined above, with 1-amino-3-hydroxyguanidine (III).

In accordance with the above process, the compounds of Formula I are prepared by treating the aldehydes of Formula II with 1-amino-3-hydroxyguanidine (III) or an acid addition salt thereof in lower alkanol solvent, e.g., methanol or isopropanol. The reaction may be conducted at a temperature of from about 20–70° C., preferably 25–45° C. The resulting product (I) is recovered by conventional techniques such as recrystallization and filtration.

When an acid addition salt of 1-amino-3-hydroxyguanidine is utilized, the resulting product (I) is obtained as the corresponding acid addition salt. Such salt may be converted to the free base by conventional techniques. When an acid addition salt of the compound of Formula I is desired, it may be obtained by salifying the free base.

Certain of the aldehyde of Formula II are known and may be prepared according to methods disclosed in the literature. Those other aldehydes (II) not specifically disclosed may be prepared by analogous methods from known materials.

The 1-amino-3-hydroxyguanidine (III) is prepared by treating in solvent and in the presence of base an acid addition salt of an S-lower-alkyl or S-benzylisothiosemicarbazide (IV), preferably S-methyl-isothiosemicarbazide, with an acid addition salt (e.g., hydrohalide) of hydroxylamine. The acid addition salts of (IV) useful according to this procedure include strong mineral acid addition salts such as the hydrohalide salts, e.g., the hydrochloride salts and the hydroiodide salts, the loweralkyl sulfate salts such as the methyl sulfate salt, and the like. Alkali and alkaline earth metal hydroxides, preferably sodium hydroxide and potassium hydroxide are useful as the base present. About 1 molar equivalent of the base should be used to obtain good conversion to the 1-amino-3-hydroxyguanidine (III). The reaction is conducted at a temperature of about 20°–60° C., preferably about 25°–35° C. It is preformed in aqueous solvent such as water either alone or in admixture with lower alkanol such as ethanol and isopropanol, and the like. The guanidine (III) may be recovered according to conventional techniques and converted to acid addition salts such as those mentioned above by salification.

The compounds of Formula I may alternatively be prepared by treating a substituted benzaldehyde S-loweralkylisothiosemicarbazone (V) with hydroxylamine (the latter preferably as an acid addition salt, e.g., a hydrohalide such as the hydrochloride). The reaction may be represented as follows:

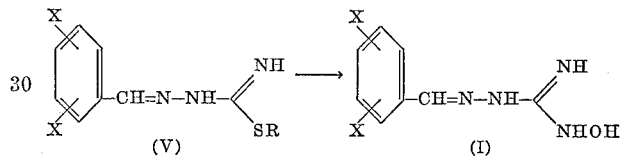

where X is as previously defined and R represents loweralkyl, i.e., alkyl having 1–4 carbon atoms such as methyl, ethyl, isopropyl and the like.

The isothiosemicarbazone (V) is treated with the hydroxylamine in a solvent which dissolves both reactants, such as water in admixture with a loweralkanol, e.g., methanol or ethanol, or a tetrahydrofuran-water mixture, and the like. The reaction may be carried out at a temperature of about 10° C. to reflux temperature, preferably at about 20° C.–50° C. The particular solvent and temperature used is not critical in obtaining the compounds (I). In a manner similar to that earlier described respecting the process for preparing the compounds (I), use of acid addition salt of hydroxylamine provides a corresponding salt of the benzylideneamino guanidine (I).

The S-loweralkylisothiosemicarbazones (V) are prepared by treating a substituted benzaldehydethiosemicarbazone of the formula

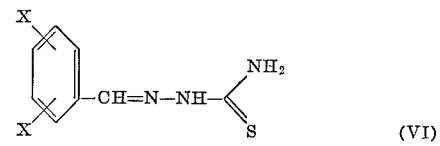

where X is as earlier defined, in solvent with a loweralkyl halide, preferably the bromide or iodide, such as methyl iodide, methyl bromide, ethyl iodide an the like. This reaction may be conducted in solvent such as methylene chloride, tetrahydrofuran, benzene, alcohols, e.g., loweralkanols such as methanol, ethanol and isopropanol, mixtures thereof, and the like, from about room temperature to the reflux temperature of the system, preferably 50°–80° C. Neither the particular solvent nor the reaction temperature is critical. The intermediate (V) is recovered by conventional techniques as the acid addition salt, e.g., the hydroiodide.

Said salt is converted to the free base (V) by treatment with sodium carbonate in solvent capable of dissolving the reactants such as water or a water-lower alkanol mixture at a temperature of from about 0° to about 50° C., conveniently about room temperature. These temperatures are not, however, critical in obtaining the free base.

Some of the compounds (VI) are known and are prepared according to methods disclosed in the literature. Those of the compounds of Formula VI not specifically disclosed may be prepared by treating an appropriately substituted benzaldehyde with thiosemicarbazide in solvent such as ethanol at reflux temperature.

Similarly, certain of the compounds of the formula (IV) are known compounds and may be prepared by methods disclosed in the literature. Those compounds not specifically disclosed in the literature may be prepared by analogous methods from known materials.

The compounds of Formula I may also be represented by their tautomeric equivalents as indicated by Formulas VII and VIII.

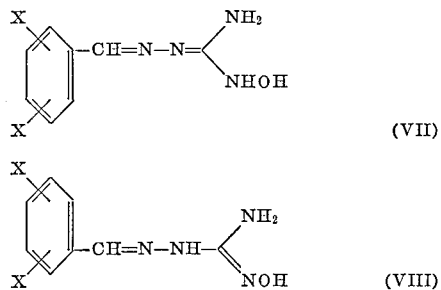

Such equivalents are intended to be within the scope of the present invention, but reference is made herein to the compounds (I) for convenience.

The compounds represented by Formula I above are useful because they possess pharmaceutical properties in animals. In particular, these compounds are useful as hypotensives, as indicated by their activity in anesthetized dog given .03–.1 mg./kg. i.v. of active material and tested by blood pressure measurement using a mercury manometer or transducer via a catheter inserted in the carotid or femoral artery. When so utilized, the compounds may be combined with one or more pharmaceutically acceptable carriers or adjuvants. They may be administered orally or parenterally and, depending upon the compound employed and the mode of administration, the exact dosage utilized may vary.

Furthermore, the compounds (I) may be similarly administered in the form of their non-toxic pharmaceutically acceptable acid addition salts. Such salts possess the same order of activity as the free base, are readily prepared by reacting the base with an appropriate acid and accordingly are included within the scope of the invention. Representative of such salts are the mineral acid salts, such as the hydrochloride, hydrobromide, sulfate, phosphate and the like and the organic acid salts, such as the succinate, benzoate, acetate, p-toluene-sulfonate, benzene-sulfonate and the like.

In general, satisfactory results are obtained when these compounds are administered at a daily dosage of about .01 milligram to about 10 milligrams per kilogram of animal body weight. This daily dosage is preferably administered 2 to 4 times a day, or in sustained release form. For most large mammals such as primates, the total daily dosage is from about 0.1 milligram to about 40.0 milligrams. Dosage forms suitable for internal use comprise from about 0.25 milligram to about 20 milligrams of the active compound in intimate admixture wth a solid or liquid pharmaceutically acceptable carrier or diluent.

A representative formulation suitable for oral administration is a tablet prepared by standard tabletting techniques which contains the following:

| Ingredient: | Parts by wt. |
|---|---|
| 1-(2,6-dichlorobenzylideneamino)-3 - hydroxyguanidine hydrochloride | 10 |
| Tragacanth | 2 |
| Lactose | 79.5 |
| Corn starch | 5 |
| Talcum | 3 |
| Magnesium stearate | 0.5 |

The compound of Formula I also have use as agrochemicals and are useful as antifungals and herbicides.

The following examples are provided for the purpose of illustration and not by way of limitation. They are not intended so as to limit the scope of the invention as defined in the appended claims.

EXAMPLE 1

1-(2,6-dichlorobenzylideneamino)-3-hydroxyguanidine hydrochloride

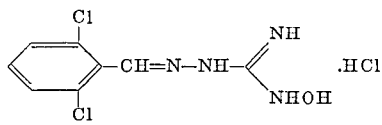

2 N sodium hydroxide solution (5 ml.) is added to a stirred suspension of S-methylisothiosemicarbazide hydroiodide (2.33 g.) and hydroxylamine hydrochloride (0.70 g.) in water (6 ml.) and stirred for 48 hours. The solution is evaporated in vacuo to provide 1-amino-3-hydroxyguanidine. One third of the residue is dissolved in 16 ml. of ethanol and 2,6-dichlorobenzaldehyde (0.6 g.) is added to this solution. The reaction mixture is then stirred for 48 hours. The solution is then evaporated in vacuo and the residue dissolved in ether (30 ml.) and in hydrochloric acid (30 ml.). The aqueous phase is rendered alkaline with 2 N sodium carbonate solution and extracted with ether. The ether layer is dried with sodium sulfate and evaporated. The residue is dissolved in ether and excess dry hydrogen chloride is passed into the solution. The resultant mixture is evaporated in vacuo and the residue triturated with methylene chloride to afford a crude product. Recrystallization from ethanol-ether (1:3) provides 1-(2,6-dichlorobenzylideneamino)-3-hydroxyguanidine hydrochloride; M.P. 173°–175° C. When the above process is carried out and S-benzylisothiosemicarbazide hydroiodide is used in place of S-methylisothiosemicarbazide hydroiodide, the identical product is again obtained.

EXAMPLE 2

1-(2,6-dichlorobenzylideneamino)-3-hydroxyguanidine hydrochloride (alternate procedure)

A mixture of 2,6-dichlorobenzaldehyde (87.5 g.), thiosemicarbazide (45.5 g.) and ethanol (400 ml.) is heated under reflux with stirring for 2 hours. The reaction mixture is cooled and crystalline 2,6-dichlorobenzaldehyde thiosemicarbazone is collected by filtration; M.P. 236–237° dec.

A mixture of 2,6-dichlorobenzaldehyde thiosemicarbazone (118.5 g.), methyliodide (70 g.) and ethanol (500 ml.) is heated under reflux with stirring for 3 hours. The reaction mixture is cooled and the product collected by filtration to afford 2,6-dichlorobenzaldehyde methylisothiosemicarbazone hydroiodide; M.P. 209°–211° dec.

A mixture of 2,6-dichlorobenzaldehyde methylisothiosemicarbazone hydroiodide (214 g.) and 2 N sodium carbonate solution (1000 ml.) is stirred for 1 hour. The resultant solid is collected by filtration and washed with 800 ml. water to provide 2,6-dichlorobenzaldehyde methylisothiosemicarbazone; M.P. 77–79°.

Solid 2,6-dichlorobenzaldehyde methylisothiosemicarbazone (119 g.) is added to a solution of hydroxylamine hydrochloride (62.8 g.) in water (150 ml.) and ethanol (1000 ml.) and stirred for 18 hours. The clear solution is evaporated in vacuo and the residue taken up in a mixture of 1500 ml. water, 200 ml. 2 N hydrochloric acid and 1500 ml. ether. The aqueous phase is separated and made basic with 200 ml. of concentrated ammonium hydroxide. After stirring for ½ hour, the resultant solid is collected by filtration, washed with water, and dried to afford the free base, which is suspended in methanol (800 ml.) and treated with hydrogen chloride gas to form the salt. The resultant solution is evaporated in vacuo and the residue crystallized from isopropanol-ether (approximately 1:2) to give the crude salt. Recrystallization from isopropanol-ether (1:1) gives 1-(2,6-dichlorobenzylideneamino)-3-hydroxyguanidine hydrochloride; M.P. 173°–176°.

When this procedure is repeated and o-chlorobenzaldehyde or 2,4-dichlorobenzaldehyde is used in place of 2,6-dichlorobenzaldehyde, there is obtained 1-(2-chlorobenzylideneamino) - 3 - hydroxyguanidine hydrochloride (M.P. 216° C. with decomposition) and 1-(2,4 - dichlorobenzylideneamino) - 3 - hydroxyguanidine hydrochloride (M.P. 225° C. with decomposition), respectively.

What is claimed is:
1. A compound of the formula

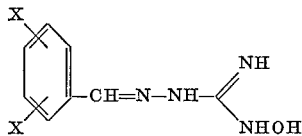

where each X, independently, represents hydrogen or halo having an atomic weight of about 19–36, provided at least one X is other than hydrogen, or a salt thereof of a pharmaceutically acceptable acid.

2. The compound according to claim 1 wherein the X substituents are at the positions 2- and 6- and represent chloro.

3. The hydrochloride salt of the compound of claim 2.

4. The compound according to claim 1 wherein one X is hydrogen and the other is chloro located in an ortho-position.

5. The compound according to claim 1 wherein the X substituents are at the positions 2- and 4- and represent chloro.

6. The compound of claim 2 which is the salt of a pharmaceutically acceptable acid.

7. A compound as defined in claim 1 of the formula

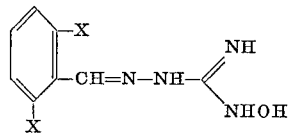

where X is as defined in claim 1, or a salt thereof of a pharmaceutically acceptable acid.

References Cited

UNITED STATES PATENTS

| | | | |
|---|---|---|---|
| 3,130,232 | 4/1964 | Paquette | 260—564 |
| 3,349,099 | 10/1967 | Marxer | 260—326.14 |

FOREIGN PATENTS

| | | | |
|---|---|---|---|
| 958,832 | 2/1957 | Germany | 260—564 |

OTHER REFERENCES

Yale, J. of Medicinal and Pharmaceutical Chemistry, vol. 1, No. 2, pp. 121–133 (1959).

BERNARD HELFIN, Primary Examiner

G. A. SCHWARTZ, Assistant Examiner

U.S. Cl. X.R

71—121; 260—552; 424—326